United States Patent [19]
Myers et al.

[11] Patent Number: 5,838,151
[45] Date of Patent: Nov. 17, 1998

[54] WIRELESS LOAD SHARING FOR PARALLEL POWER CONVERTERS AND METHOD

[75] Inventors: Ronald Gene Myers, Scottsdale; Paul Herbert Rogers, Chandler, both of Ariz.

[73] Assignee: Motorola, Inc., Schaumburg, Ill.

[21] Appl. No.: 810,386

[22] Filed: Mar. 3, 1997

[51] Int. Cl.[6] .................................................. G05B 24/02
[52] U.S. Cl. ............................................. 323/353; 307/51
[58] Field of Search .................................... 323/280, 281, 323/269, 272, 353, 354; 307/51

[56] References Cited

U.S. PATENT DOCUMENTS

| | | | |
|---|---|---|---|
| 4,536,699 | 8/1985 | Baker | 323/275 |
| 4,717,383 | 1/1988 | Small | 307/44 |
| 5,319,303 | 6/1994 | Yomada | 323/313 |

FOREIGN PATENT DOCUMENTS

| | | | |
|---|---|---|---|
| 58-0154019 | 9/1983 | Japan | 323/281 |

OTHER PUBLICATIONS

An Article entitled "Paralleling Power Converters" by Alfonso J. Cioffi, AT&T Bell Laboratories, Dallas, TX from Jan. 1991 Electrical Manufacturing, pp. 27–31.

An Article entitled "Load Sharing With Paralleled Power Supplies" by Bob Mammano and Mark Jordan, Sep. 1991, pp. 2-1—2-4, Unitrode Corp.

Primary Examiner—Shawn Riley
Attorney, Agent, or Firm—Frederick M. Fliegel; Jennifer B. Wuamett

[57] ABSTRACT

A power supply (10) including a virtual resistor. The power supply (10) includes (i) a power stage (11) having an input (12) for accepting unregulated power, an output (14) for providing regulated power, a control input (13) and a current sense output (16); (ii) a control circuit (15) including an error amplifier (19) having an inverting input coupled to the output (14) and an output coupled to the control input (13); and (iii) a virtual resistance generator (25) having an input coupled to the output of the error amplifier (19) and an output coupled to a non inverting input of the error amplifier (19). The virtual resistance generator (25) is for supplying a reference voltage (27) to the control circuit (15) such that a voltage present at the output for providing regulated power (14) as a function of current leaving the output for providing regulated power (14) provides an output virtual resistance.

17 Claims, 1 Drawing Sheet

WIRELESS LOAD SHARING FOR PARALLEL POWER CONVERTERS AND METHOD

FIELD OF THE INVENTION

This invention relates in general to the field of power supplies, in particular to pluralities of power supplies and more particularly to an improved, wireless technique for paralleling plural power supplies to provide increased power supply capacity.

BACKGROUND OF THE INVENTION

Load sharing is important for many electronic products which require multiple power supplies and/or which include a number of separate modules. It is desirable in such settings to avoid having unbalanced power supply current due to small differences in output voltage calibration. Use of a plurality of power supplies has advantages such as (i) use of a standardized module that may be combined as needed to meet a specific requirement, (ii) distribution of thermal loading/heat removal and (iii) enhanced reliability through redundancy. However, this requires some additional design in order to balance loading between paralleled supplies, without which some will "hog" more of the load and thus tend to dissipate more heat. Heating is, in turn, related to likelihood of failure. Load balancing is thus desirable in these settings.

Additionally, interconnections between power supplies typically suffer from lack of shielding and are susceptible to picking up and distributing electronic noise. Also, current loops may be established that contribute to both inefficiency and noise pickup.

Techniques for paralleling multiple power supplies generally utilize sensing circuitry that in turn requires additional wires between the multiple supplies, as described, for example, in "Load Sharing with Paralleled Power Supplies" by Bob Mammano and Mark Jordan, Sep. 1991, Unitrode Power Supply Design Seminar, SEM-800, pp. 2-1 to 2-4 (see, e.g., FIG. 1 and associated text). In some cases, a master unit having current controlling circuitry is coupled to other units that are controlled by the master unit. The advantages include lower cost for the controlled units, because they do not include current control circuitry, but this is achieved at the expense of the entire power supply system being dependent on operation of the master unit (see "Paralleling Power Converters" by A. Cioffi, Electrical Manufacturing, Jan. 1991, pp. 27–31). These concerns and others are discussed in U.S. Pat. No. 4,717,833, issued to K. Small and entitled "Single Wire Current Share Paralleling of Power Supplies" (Jan. 5, 1988). The above noted patents and articles are hereby incorporated herein by reference.

Thus, what is needed is a practical, economical method for paralleling a multiplicity of power supplies without incurring current hogging, without increasing susceptibility to power supply produced or system induced distributed noise, without adding complicated interconnections and preserving immunity to single point failures and no loss of efficiency.

DETAILED DESCRIPTION OF THE DRAWINGS

Figure 1:
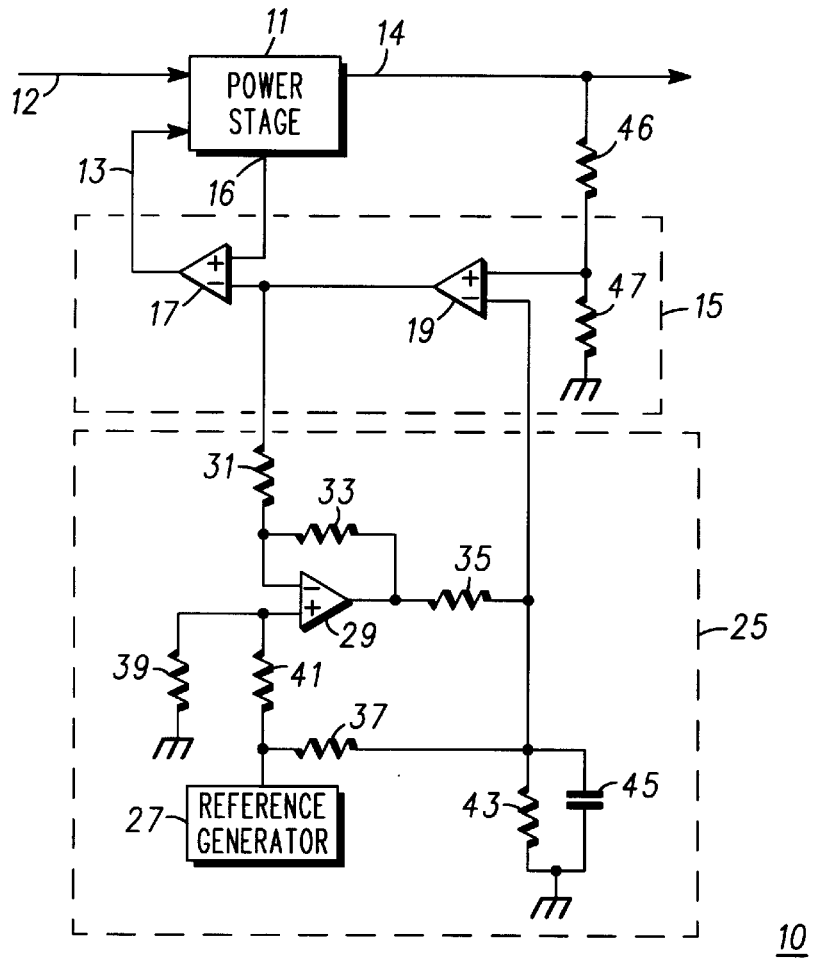
FIG. 1 is a simplified block diagram of a single power supply in accordance with the teachings of the instant invention.

FIG. 1 is a schematic diagram of power supply 10 in accordance with the teachings of the instant invention. Power supply 10 includes three major subassemblies: (i) power stage 11, (ii) power control circuit 15 and (iii) virtual resistance generator 25.

Power stage 11 comprises a multiplicity of functions operating to provide regulated output voltage on line 14 from unregulated supply voltage coupled via line 12. Power stage 11 is typically realized as an input filter, power switching transistors, power switching transistor drivers, power transformer, output power rectifiers, output filter, transient snubbers, house keeping power supply (internal power supply for circuits 17, 19), current sensing and generation of a signal on line 16 proportional to the output current.

Power control circuit 15 senses the output voltage, the outer control loop parameter, on line 14 via the inverting input to error amplifier 19. The reference signal non inverting input to error amplifier 19 is coupled via resistor 37 to the output of reference voltage generator 27 and via resistor 35 to the output of operational amplifier 29. Additionally, resistor 43 and capacitor 45 couple this node to ground, in effect dividing down and filtering the reference generator output. Resistors 37 and 43 are used to calibrate virtual resistance generator 25 by setting the initial level of the reference signal. Power control circuit 15 also includes comparator 17 having an inverting input coupled to the output of error amplifier 19 and a non inverting input coupled via line 16 to the effective output current sensing signal of power stage 11, the inner control loop parameter. The effective power supply output current sense signal on line 16 is equal to the output voltage from error amplifier 19. Error amplifier 19 then has an output signal with the same dynamics as the regulator control loop (i.e., is proportional to the power supply current) and this output signal is the input to the virtual output resistance generator 25, coupled via resistor 31.

Virtual resistance generator 25 usefully comprises resistors 31 and 33, which set the gain of operational amplifier 29. Resistors 39 and 41 divide the output of reference generator 27 to provide an offset level to the non inverting input of operational amplifier 29. These two functions calibrate the output voltage level and swing from amplifier 29 as a function of the power supply output current. Resistor 35 scales and adds output signal 29 to the portion of the output signal from reference generator 27 from the voltage divider comprising resistors 37 and 43, with the resulting combination reference signal being fed into the non inverting input of error amplifier 19 in power control circuit 15. This reference signal sets the nominal power supply output voltage and also sets the output voltage to sag as a function of the output current. The slope of the output voltage versus current curve is the virtual power supply output resistance as defined by the combination of the signals from reference generator 27, error amplifier 19 and operational amplifier 29.

When the output voltage on lead 14 is below a certain level defined by the combination of signals from virtual resistance generator 25 and error amplifier 19, a positive voltage swing is produced at the output of error amplifier 19. This larger error signal then requires a larger current sense signal on line 16 to operate comparator 17. The current sense signal on line 16 from power stage 11 is a ramp function of time, thus comparator 17 generates a wider output pulse at control input 13 of power stage 11 to provide more current to lead 14 and thereby increasing the voltage present on lead 14. Similarly, when the voltage on lead 14 exceeds a certain level, error amplifier 19 provides a negative voltage swing at the output of error amplifier 19, reducing the pulse width produced by comparator 17 and hence reducing the drive level to power stage 11. This results in less current being provided to lead 14 and reduces the output voltage accordingly. Thus, the voltage on lead 14 is tightly controlled as defined by virtual resistance generator 25 output and the feedback loop.

EXAMPLE

Table I below provides typical component values or art numbers for one realization of the circuit of FIG. 1.

TABLE I

TYPICAL COMPONENT VALUES AND PART NUMBERS FOR POWER SUPPLY CIRCUIT.

| Ref. No. | Value or Part Number & Mfr. |
| --- | --- |
| 10 | 01-P36000U, Motorola, Chandler, AZ |
| 17, 19 | UC 1825, Unitrode, Merrimack, NH or MC 1825, Motorola, Austin TX |
| 27 | AD 586, Analog Devices, Norwood, MA |
| 29 | MC33072, Motorola, Austin TX |
| 31 | 10 KΩ |
| 33 | 20 KΩ |
| 35 | 511 KΩ |
| 37 | 10 KΩ |
| 39 | 10 KΩ |
| 41 | 7.5 KΩ |
| 43 | "pen" |
| 45 | 1000 pF |
| 46 | 10 KΩ |
| 47 | 24 KΩ (Selectable or trimmable) |

Figure 2:
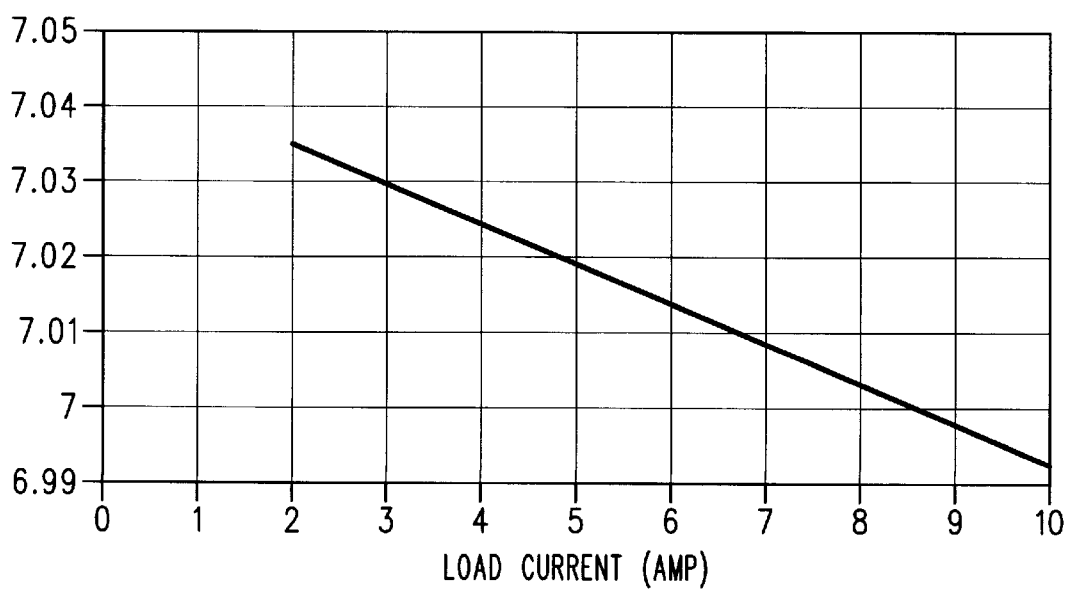
FIG. 2 is a graph of power supply output voltage versus output current in accordance with the teachings of the instant invention.

A power supply built using the values and parts listed in Table I provided the measured results given below in FIG. 2, which is a graph of power supply output voltage versus output current in accordance with the teachings of the instant invention. This power supply provided between zero and ten amperes from an unregulated supply having a nominal voltage of 28 volts while maintaining an output voltage of 7.031+/−39 mV volts.

Circuit 10 advantageously uses existing error amplifiers 17, 19 to also sense output current magnitude. Circuit 10 also allows adjustment of $V_{REF}$ to force the droop on the power supply output.

This concept has been implemented into a satellite payload panel approach which utilizes multiple parallel connected power converters connected to a 20 foot rectangular bus bar, with the physical locations of the power converter connections distributed over the length of the bar. The bus bar then feeds various loads which are also spread out over the length of the bar. For the case of seven parallel +5V power converters, with an output slope of −4 mV/A, all seven power converter load currents were within 0.45 A of one another.

Under heavy pulse loading conditions, the +5V secondary bus voltage remained within the specified +1 to −3% range, as it was designed for. In this case, the power converters incorporated remote voltage sensing to ensure that all power converters were reading the same output voltage, regardless of their physical location on the bus bar. Additionally, laser trimming was performed at the module level at heavy loading to eliminate all initial circuit component tolerances as well as to guarantee optimal load sharing at the heavy load currents, where it is needed most for reliability.

Thus, a power supply module for a distributed power supply system has been described which overcomes specific problems and accomplishes certain advantages relative to prior art methods and mechanisms. The improvements over known technology are significant. The expense, complexities, and high reliance on a single module are avoided. Similarly, current hogging and the attendant disequilibrium in load sharing and heating are avoided.

The foregoing description of the specific embodiments will so fully reveal the general nature of the invention that others can, by applying current knowledge, readily modify and/or adapt for various applications such specific embodiments without departing from the generic concept, and therefore such adaptations and modifications should and are intended to be comprehended within the meaning and range of equivalents of the disclosed embodiments.

It is to be understood that the phraseology or terminology employed herein is for the purpose of description and not of limitation. Accordingly, the invention is intended to embrace all such alternatives, modifications, equivalents and variations as fall within the spirit and broad scope of the appended claims.

We claim:

1. A power supply including a virtual resistor, said power supply comprising:

a power stage having an input for accepting unregulated power, an output for providing regulated power, a control input and a current sense output;

a control circuit including an error amplifier having an inverting input coupled to said for providing regulated power output and an output coupled to said control input;

a virtual resistance generator having an input coupled to said output of said error amplifier and an output coupled to a non inverting input of said error amplifier, said virtual resistance generator for supplying a reference voltage to said control circuit such that a voltage present at said output for providing regulated power as a function of current leaving said output for providing regulated power provides an output virtual resistance, said virtual resistance generator comprising a first resistor having a first end coupled to said input of said virtual resistance generator and a second end coupled to an inverting input of an operational amplifier; and a second resistor having a first end coupled to said inverting input of said operational amplifier and a second end coupled to an output of said operational amplifier, said first and second resistors setting a gain for said operational amplifier, said output of said operational amplifier being coupled to said non inverting input of said error amplifier via a third resistor.

2. A power supply as claimed in claim 1, wherein said control circuit comprises a voltage divider circuit having an input coupled to said output for providing regulated power and a divider output coupled to said inverting input of said error amplifier.

3. A power supply as claimed in claim 1, wherein said control circuit comprises:

a comparator having an inverting input coupled to said output of said error amplifier; and a current sense input coupled to said current sense output, said current sense input being coupled to a non inverting input of said comparator, wherein an output of said comparator is coupled to said control input.

4. A power supply as claimed in claim 1, wherein said virtual resistance generator further comprises:
   a voltage reference generator for providing a reference voltage at an output;
   a voltage divider having an input coupled to said output of said voltage reference generator and having an output coupled to a non inverting input of said operational amplifier; and
   a resistor coupling said output of said voltage reference generator to said non inverting input of said error amplifier.

5. A power supply as claimed in claim 4, wherein said virtual resistance generator additionally comprises a capacitor having a first lead coupled to said non inverting input of said error amplifier and a second lead coupled to ground.

6. A method for regulating a power supply, said power supply comprising a power stage having an input for accepting unregulated power, an output for providing regulated power, a control input and a current sense output, a control circuit including an error amplifier having a inverting input coupled to said output for providing regulated power and an output coupled to said control input, and a virtual resistance generator having an input coupled to said error amplifier and an output coupled to an input of said error amplifier, said virtual resistance generator for supplying a reference voltage to said control circuit such that a voltage present at said output for providing regulated power as a function of current leaving said output for providing regulated power provides an output virtual resistance, said method comprising steps of:
   dividing a voltage from said output for providing regulated power to provide a fractional output voltage;
   supplying said fractional output voltage to a non inverting input of said error amplifier;
   providing an output signal from said error amplifier to a first input of a comparator;
   providing a reference signal to second input of said comparator;
   coupling an output signal from said comparator to said control input; and
   buffering said output signal from said virtual resistance generator, said buffering step including a step of providing a capacitor coupled between said output signal from said virtual resistance generator and ground.

7. A method as claimed in claim 6, further comprising steps of:
   coupling said output signal from said error amplifier to said input of said virtual resistance generator; and
   providing an output signal from said virtual resistance generator to said non inverting input of said error amplifier.

8. A method as claimed in claim 7, further comprising steps of:
   coupling an inverting input of an operational amplifier to said input of said virtual resistance generator;
   setting a gain for said operational amplifier by providing a ratio of resistor values; and
   coupling an output signal from said operational amplifier to said non inverting input of said error amplifier.

9. A method as claimed in claim 8, further comprising steps of:
   providing a reference voltage generator having an output for providing reference output voltage; and
   coupling said reference output voltage to a non inverting input of said operational amplifier.

10. A method as claimed in claim 9, wherein said step of coupling said reference output voltage includes steps of:
    providing a resistive voltage divider having an input and a divided voltage output;
    coupling said input of said resistive voltage divider to said output of said reference voltage generator; and
    coupling said divided voltage output to said non inverting input of said operational amplifier.

11. A method as claimed in claim 10, further comprising a step of coupling said output of said reference voltage generator to said non inverting input of said error amplifier.

12. A power supply including a virtual resistor, said power supply comprising:
    a power stage having an input for accepting unregulated power, an output for providing regulated power, a control input and a current sense output;
    a control circuit including an error amplifier having an inverting input coupled to said output for providing regulated power and an output coupled to said control input, wherein said control circuit comprises a voltage divider circuit having an input coupled to said output for providing regulated power, a divider output coupled to an inverting input of said error amplifier, a comparator having an inverting input coupled to said output of said error amplifier, a current sense input coupled to said current sense output, said current sense input being coupled to a non inverting input of said comparator, wherein an output of said comparator is coupled to said control input; and
    a virtual resistance generator having an input coupled to said output of said error amplifier and an output coupled to a non inverting input of said error amplifier, said virtual resistance generator for supplying a reference voltage to said control circuit such that a voltage present at said output for providing regulated power as a function of current leaving said output for providing regulated power provides an output virtual resistance, said virtual resistance generator comprising a first resistor having a first end coupled to said input of said virtual resistance generator and a second end coupled to an inverting input of an operational amplifier, a second resistor having a first end coupled to said inverting input of said operational amplifier and a second end coupled to an output of said operational amplifier, said first and second resistors setting a gain for said operational amplifier, said output of said operational amplifier being coupled to said non inverting input of said error amplifier via a third resistor.

13. A power supply as claimed in claim 12, wherein said virtual resistance generator further comprises:
    a voltage reference generator for providing a reference voltage at an output;
    a voltage divider having an input coupled to said output of said voltage reference generator and having an output coupled to a non inverting input of said operational amplifier; and
    a resistor coupling said output of said voltage reference generator to said non inverting input of said error amplifier.

14. A power supply as claimed in claim 13, wherein said virtual resistance generator additionally comprises a capacitor having a first lead coupled to said non inverting input of said error amplifier and a second lead coupled to ground.

15. A power supply including a virtual resistor, said power supply comprising:
    a power stage having an input for accepting unregulated power, an output for providing regulated power, a control input and a current sense output;

a control circuit including an error amplifier having an inverting input coupled to said output for providing regulated power and an output coupled to said control input, wherein said control circuit comprises a voltage divider circuit having an input coupled to said output for providing regulated power and a divider output coupled to said inverting input of said error amplifier, wherein said control circuit comprises:

a comparator having an inverting input coupled to said output of said error amplifier; and a current sense input coupled to said current sense output, said current sense input being coupled to a non inverting input of said comparator, wherein an output of said comparator is coupled to said control input; and a virtual resistance generator having an input coupled to said output of said error amplifier and an output coupled to a non inverting input of said error amplifier, said virtual resistance generator for supplying a reference voltage to said control circuit such that a voltage present at said output for providing regulated power as a function of current leaving said output for providing regulated power provides an output virtual resistance, wherein said virtual resistance generator comprises:

a first resistor having a first end coupled to said input of said virtual resistance generator and a second end coupled to an inverting input of an operational amplifier; and a second resistor having a first end coupled to said inverting input of said operational amplifier and a second end coupled to an output of said operational amplifier, said first and second resistors setting a gain for said operational amplifier, said output of said operational amplifier being coupled to said non inverting input of said error amplifier via a third resistor.

16. A power supply as claimed in claim 15, wherein said virtual resistance generator further comprises:

a voltage reference generator for providing a reference voltage at an output;

a voltage divider having an input coupled to said output of said voltage reference generator and having an output coupled to a non inverting input of said operational amplifier; and a resistor coupling said output of said voltage reference generator to said non inverting input of said error amplifier.

17. A power supply as claimed in claim 16, wherein said virtual resistance generator additionally comprises a capacitor having a first lead coupled to said non inverting input of said error amplifier and a second lead coupled to ground.

* * * * *

UNITED STATES PATENT AND TRADEMARK OFFICE
CERTIFICATE OF CORRECTION

PATENT NO. : 5,838,151
DATED : November 17, 1998
INVENTOR(S) : Ronald Gene Myers et al.

It is certified that error appears in the above-identified patent and that said Letters Patent is hereby corrected as shown below:

Claim 1, column 4, line 32, insert --output-- after "said".

Claim 1, column 4, line 33, delete "output" after "power".

Signed and Sealed this

Thirteenth Day of July, 1999

Attest:

Q. TODD DICKINSON

Attesting Officer

Acting Commissioner of Patents and Trademarks